April 13, 1926.

N. H. GILMAN 1,581,084

SPRING COUPLING

Filed July 16, 1923    2 Sheets-Sheet 1

INVENTOR.
Norman H. Gilman,
BY
ATTORNEY.

April 13, 1926.
N. H. GILMAN
SPRING COUPLING
Filed July 16, 1923
1,581,084
2 Sheets-Sheet 2
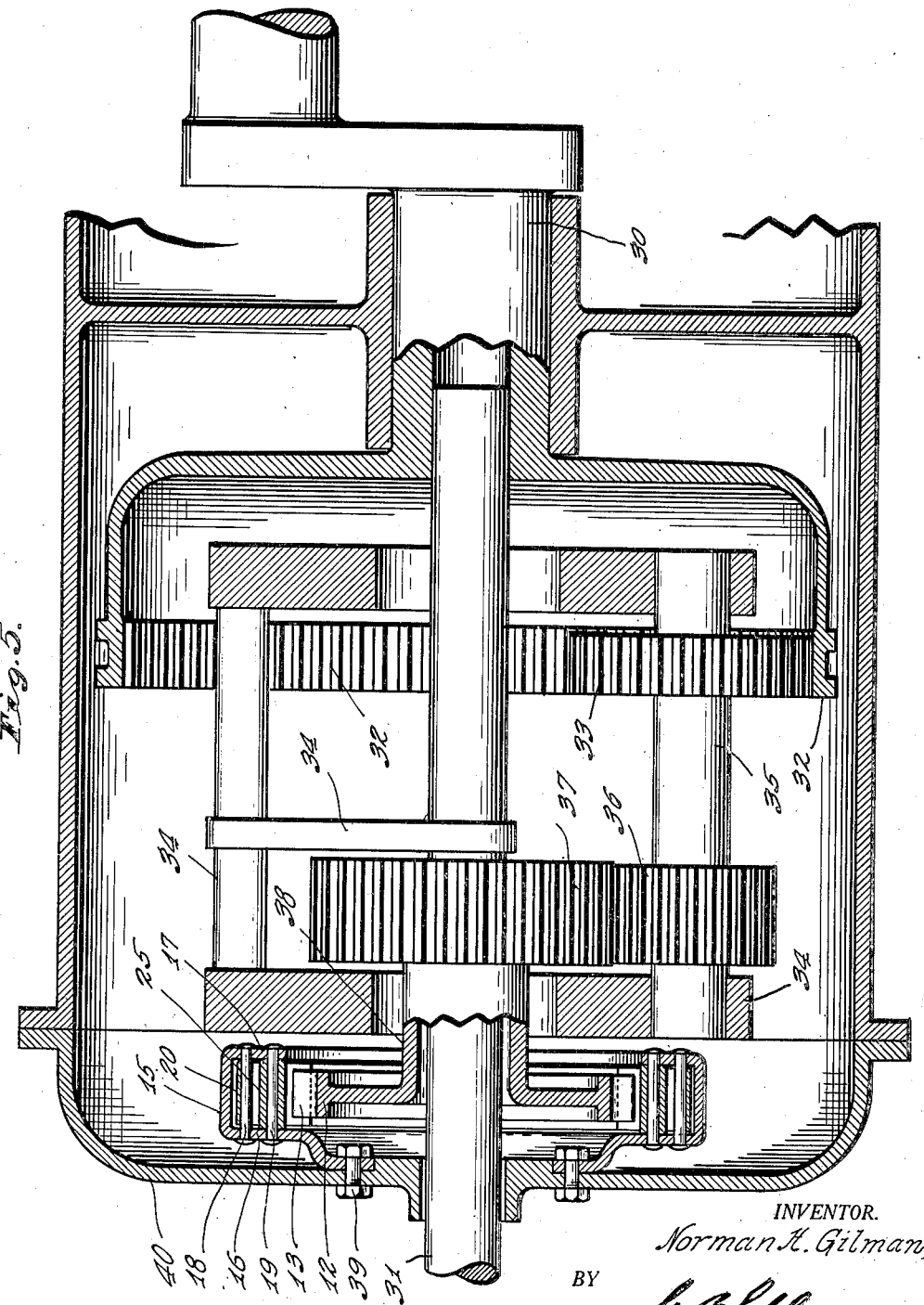
INVENTOR.
Norman H. Gilman,
BY
ATTORNEY.

Patented Apr. 13, 1926.

1,581,084

UNITED STATES PATENT OFFICE.

NORMAN H. GILMAN, OF INDIANAPOLIS, INDIANA, ASSIGNOR TO ALLISON ENGINEERING COMPANY, OF INDIANAPOLIS, INDIANA, A CORPORATION OF INDIANA.

SPRING COUPLING.

Application filed July 16, 1923. Serial No. 651,755.

*To all whom it may concern:*

Be it known that I, NORMAN H. GILMAN, a citizen of the United States, residing at Indianapolis, in the county of Marion and State of Indiana, have invented a new and useful Spring Coupling, of which the following is a specification.

It is the object of my invention to provide an efficient spring coupling to connect two members between which there is a tortional oscillation; which coupling will itself have a long working life under severe conditions, and which is capable of transmitting heavy loads and withstanding heavy oscillating stresses; and to provide a speed-reducing transmission mechanism which includes a spring coupling at a place where the stresses on it are a minimum and the spring coupling is subject only to oscillation without continuous rotation.

My spring coupling is particularly intended for use in the drives of propeller shafts for automotive devices, as in those of propellers of airplanes and boats; especially when the power is obtained from internal combustion engines, where there is a continual speeding up and slowing down of the engine shaft from the intermittent explosions, with a resultant tortional oscillation between the shaft at the engine and the shaft at the propeller. This tortional oscillation is particularly noticeable when Diesel engines are used.

My spring coupling, per se, is largely based on the spring coupling shown in Patent No. 1,441,114, granted January 2, 1923, to Otterino Pomilio. The Pomilio coupling, however, was very short-lived, because its spring members broke after a very few hours of use; whereas by my present invention I increase the life of a spring coupling many fold, at least tenfold according to comparative tests which I have made and at the end of which my spring coupling was still running without any deterioration.

By providing a spring coupling which itself has a long life, I am enabled to reduce the shocks which occur noticeably in certain automotive transmission mechanism, as in water-, land-, and air-traveling vehicles; and, by reducing such shocks, to lengthen the life of the associated parts, such as the driving engine.

Figure 1:
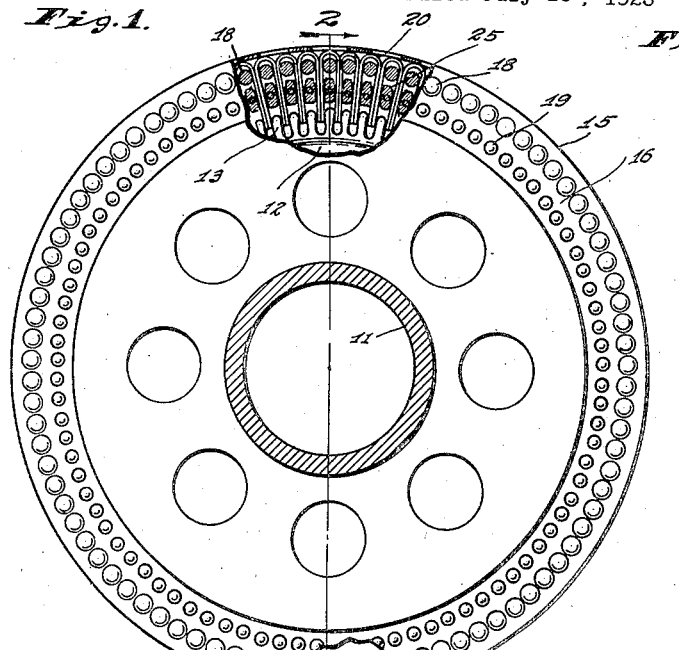
Figure 2:
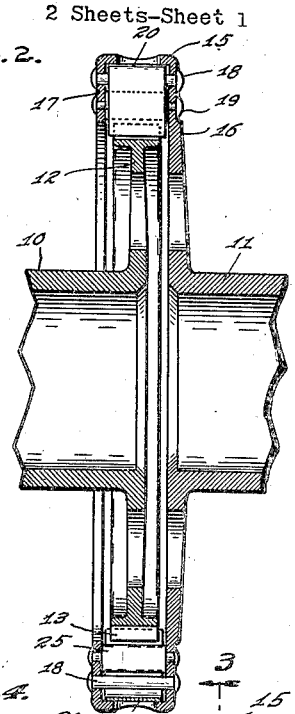
Figure 3:
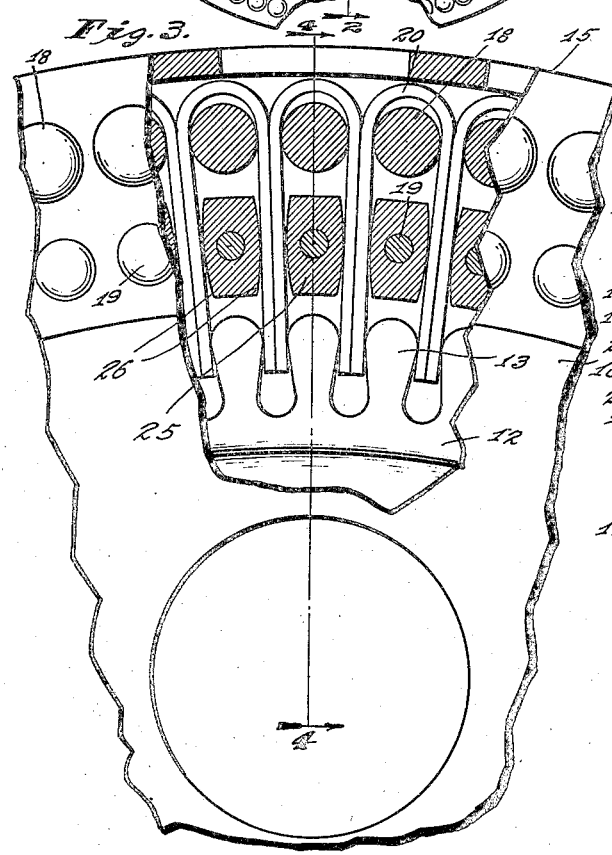
Figure 4:
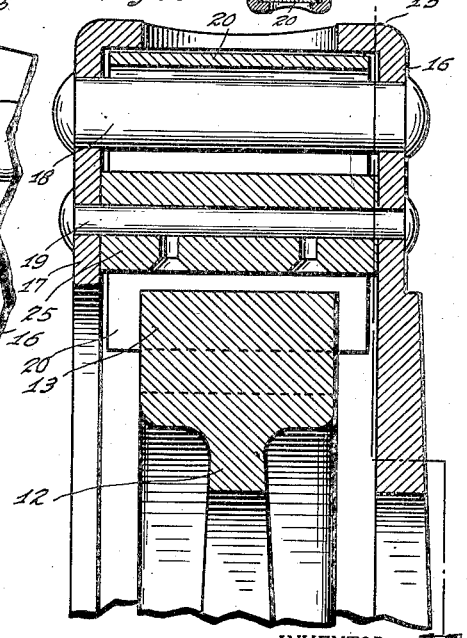

The accompanying drawings illustrate my invention: Fig. 1 is an end view of a preferred form of spring coupling embodying my invention, with some of the parts in section to show the structure; Fig. 2 is a section on the line 2—2 of Fig. 1; Figs. 3 and 4 are enlarged fragmentary views corresponding to the upper parts of Figs. 1 and 2 respectively, with the sections taken on the lines 3—3 of Fig. 4 and 4—4 of Fig. 3 respectively; and Fig. 5 is a somewhat schematic section of a speed-reducing transmission gearing provided with my spring coupling in a preferred location.

I shall first describe my spring coupling per se, in its preferred form, as connecting any two members between which a tortional oscillation arises; as for instance between driving and driven shafts, in which location, illustrated in Figs. 1 to 4 inclusive, my spring coupling finds many uses.

The two shafts 10 and 11 which in Fig. 2 are shown connected by my spring coupling may be any two members between which a torque exists, such for instance as driving and driven shafts. Either may be the driving shaft. The shaft 10 carries at its end a toothed wheel 12, with the teeth 13 preferably projecting outward from the periphery. The teeth provide spring-receiving spaces between them. There is preferably a complete annular series of the teeth 13, though for simplicity in illustration only a fragment of the entire number of teeth are shown.

An annular housing 15 surrounds the wheel 12, and is provided at its axial ends with inwardly extending flanges 16 and 17; one of these flanges, the flange 16 as shown, being carried on the end of the shaft 11. The housing 15 is provided with two concentric annular series of pins 18 and 19, both of which extend between the flanges 16 and 17. The number of pins in each series is the same as the number of teeth 13, with corresponding pins of the two series preferably on the same radii.

An annular series of U-shaped springs 20 are located astride the various pins 18 and 19, with each U-shaped member straddling a pin 18 and the radially alined pin 19. The legs of the U-shaped members extend inward beyond the pins 19 into the spaces between the teeth 13. There is preferably a U-shaped member 20 astride each pin 18 and its associated pin 19 and tooth 13, so that two adjacent legs of two adjacent U- shaped members 20 lie between any two adjacent pins 18, and between any two adjacent pins 19, and between any two adjacent teeth 13. The spacing is preferably such that these two adjacent legs of two adjacent spring members 20 are substantially in contact with each other.

As far as the verbal description has gone so far, it applies to the structure shown in the Pomilio patent. In the Pomilio device, however, the resilient U-shaped members made such sharp bends over the pins of the inner annular series that they broke very quickly in actual use. Because of this breakage of the U-shaped springs, the Pomilio device was unreliable, and has been used very little.

To avoid this breakage, I provide means for preventing sharp bends in the resilient U-shaped members 20. To do this, I make the pins 19 of smaller diameter than the pins 18, and on such smaller pins 19 I mount shoes 25. These shoes 25 have spring-engaging faces 26 much more nearly flat and of much greater radial extent than the spring-engaging parts of the pins of Pomilio's inner series. The surfaces 26 of these shoes 25 are segments of cylinders, conveniently segments of circular cylinders, with their straight-line elements parallel to the axes of the pins 18 and 19, to provide surfaces which engage the adjacent faces of the spring members 20 throughout the width of the latter. For the best results, the shoes 25 are rocking shoes, mounted on the pins 19 so that they can oscillate thereon as required by the ever-changing conditions which the spring coupling must meet. Thus these shoes 25 accommodate themselves to the changing curves of the surfaces of the U-shaped members 20, and avoid any sharp bending of the legs of such U-shaped members.

In operation, whether the shafts 10 and 11 are rotating members or substantially stationary members, there may be a tortional oscillation between them, about their common axis. In other words, there is an angular swing between the wheel 12 and the housing 15. This angular swing may be at times an actual reversal of stress between the two shafts 10 and 11, but it is usually merely a rise and fall in a uni-directional stress. In either case, the teeth 13 move relatively to the radii of the associated pins 19 and 18, and may either remain continuously on one side of such respective radii or continually cross and re-cross such radii. This relative oscillating movement results in a continuously oscillating bending of the legs of the U-shaped members 20, to accommodate and resiliently resist such oscillation. In such bending of the legs of the U-shaped members, the shoes 25 swing on their pins 19, and the relatively slightly curved surfaces 26 variably engage and disengage the abutting surfaces of the adjacent U-shaped members 20. This prevents too sharp bending of the legs of the U-shaped members, and thus effectively avoids breaking of such spring members. Further, as the legs of the U-shaped members bend, under increase of stress between the wheel 12 and housing 15, such legs come into engagement with the surfaces 26 for a greater part of their length. This cuts down the free lengths of such legs, to make them gradually stiffer under an increase of stress, so that they may effectively transmit the force between the shafts 10 and 11, and may resist the change of position between said two shafts with a returning force which increases with the relative angular displacement between such two shafts.

While the two shafts 10 and 11 may be any two shafts, with both shafts rotating or not, and with a tortional oscillation between them in either case, a most desirable place to use this spring coupling is with one of the two elements held stationary and the other connected to that gear of a planetary transmission gearing which is normally stationary but which with this connection may oscillate to reduce the shocks. One such arrangement is shown schematically in Fig. 5. The shaft 30 may be the crank-shaft of a driving engine, for driving the propeller shaft 31 of a screw-propeller, as for a boat or an airplane. Between the shafts 30 and 31 there is a speed-reducing gearing, of the planetary or cycloidal type. While this may take various forms, I have illustrated it, by way of example, as having an internal gear 32 carried by the shaft 30 and meshing with any desired number of planet gears 33 suitably carried in a rotating frame 34 rotatable on the common axis of the shafts 30 and 31 and fixed on the shaft 31. Each planet gear 33 is fixed on a planet-gear shaft 35 suitably mounted in the frame 34; and on each planet-gear shaft 35 is also fixed a second planet gear 36. The planet gears 36 mesh with a substantially stationary sun gear 37, coaxial with the shafts 30 and 31. The sun-gear 37 is shown as being carried by a sleeve 38, which at its end outside the housing 34 carries the toothed wheel 12 of my spring coupling. This toothed wheel 12 is connected to the housing 15 through the various parts 13, 18, 19, 20, and 25, in the manner already described. The housing 15 is suitably stationarily supported, as by having its carrying flange 16 attached by bolts 39 to the housing 40 of the transmission gearing. In this way, the housing 15 remains stationary; but the toothed wheel 12, and therefore the sun gear 37, may oscillate by the resilient bending of the legs of the U-shaped members 20, to take up the various shocks in the systems. This prevents the transmission of such shocks from the engine on the shaft 30 to the propeller on the shaft 31, and so prevents the reactive effect of such shocks on the engine from the resistance to sudden changes of speed of the shaft 31 and the parts carried thereby. The transmission gearing 32-33-34-35-36-37 is a speed-reducing gearing; and by interposing the spring coupling between the sun-gear 37 and the stationary part 40 and forces exerted in the spring coupling may be reduced to a fraction of what they would be if the spring coupling were interposed in either of the shafts 30 or 31.

In addition to providing for taking the shocks of the system, this spring coupling permits certain disalinement of the parts, as between the shafts 10 and 11 of Fig. 2, and thus serves to some extent as a universal joint. Its fundamental purpose, however, is to absorb the shocks of the system, and lessen the destructive effects of such shocks and the reactions therefrom on the system.

I claim as my invention:

1. A spring coupling, comprising two adjacent members, said two members being provided with three series of spring-abutments of which two are on one of said members and the third on the other member, one of the series of spring-abutments on the member having the two series being formed of shoes having elongated spring-bearing faces which are only slightly curved, and flexure springs extending across the separating gap between the two members and each co-acting with spring-abutments of all three series, substantially as set forth.

2. The construction set forth in claim 1, with the addition that said shoes are pivoted, substantially as set forth.

3. A spring coupling, comprising two adjacent members, said two members being provided with series of spring-abutments, one of the series of spring-abutments being formed of shoes having spring-bearing faces which are only slightly curved, and a plurality of U-shaped flexure springs each of which is astride spring-abutments on both members including a shoe, with both legs of the U-shaped spring extending across the separating gap between the two members, substantially as set forth.

4. The combination set forth in claim 3, with the addition that said shoes are pivotally mounted, substantially as set forth.

5. A spring coupling, comprising two adjacent members, said two members being provided with three series of spring-abutments of which two are on one of said members and the third on the other member, one of the series of spring-abutments on the member having the two series being formed of shoes having elongated spring-bearing faces which are only slightly curved, and U-shaped flexure springs extending across the gap between the two members each spring being positioned astride spring-abutments of all three series, and said shoes acting on said flexible springs at intermediate points thereon between those at which the springs cooperate with the spring-abutments of the other two series, substantially as set forth.

6. A spring coupling as in claim 5, said shoes being pivotally supported, substantially as set forth.

7. A spring coupling comprising a pair of concentric members, a series of spring-engaging teeth on the inner member, a series of spring-engaging pins on the outer member parallel to its axis, a series of spring-engaging shoes on the outer member each shoe being arranged on a radial line with a pin and a tooth, and radial springs engaging said teeth and said shoes, substantially as set forth.

8. A spring coupling comprising two adjacent members, two series of spring abutments on one of said members, a third series of spring abutments on the other member one of the series of spring-abutments on the first-named member being formed of pivoted shoes having elongated spring-bearing faces which are only slightly curved, and U-shaped flexure springs extending over the gaps between the two members each spring being positioned astride spring-abutments of all three series with adjacent legs of adjacent U-shaped springs between two adjacent shoes, substantially as set forth.

9. A spring coupling comprising two adjacent members each provided with spring-abutments arranged in series one of the series of spring-abutments comprising pivotally mounted shoes having faces which are slightly convex, and flexure springs extending across the separating gap between the two members each spring having a normally flat face coacting with and mainly spaced from a convex face on one of said pivotally-mounted shoes, substantially as set forth.

10. A spring coupling comprising two adjacent members each provided with spring-abutments arranged in series one of the series of spring-abutments comprising pivotally mounted shoes, and flexure springs extending across the separating gap between the two members each spring having a face arranged to contact approximately midway of its length with a face on one of said shoes and one of said faces being slightly curved away from the other, substantially as set forth.

In witness whereof, I have hereunto set my hand at Indianapolis, Indiana, this 13th day of July, A. D. one thousand nine hundred and twenty three.

NORMAN H. GILMAN.